United States Patent [19]

Pirri et al.

[11] Patent Number: 5,555,936
[45] Date of Patent: Sep. 17, 1996

[54] SCLEROGLUCAN GEL APPLIED TO THE OIL INDUSTRY

[75] Inventors: Rosangela Pirri, Montardon; Jacques Gadioux, Orthez; Richard Riveno, Toulouse, all of France

[73] Assignee: Societe Nationale Elf Aquitaine, Courbevoie, France

[21] Appl. No.: 405,181

[22] Filed: Mar. 16, 1995

Related U.S. Application Data

[62] Division of Ser. No. 160,332, Dec. 2, 1993, which is a continuation of Ser. No. 783,126, Oct. 28, 1991, abandoned.

[30] Foreign Application Priority Data

Oct. 29, 1990 [FR] France ................... 90 13385

[51] Int. Cl.$^6$ ................................ E21B 33/138
[52] U.S. Cl. ................ 116/295; 166/294; 166/300
[58] Field of Search .................... 166/270, 294, 166/295, 300

[56] References Cited

U.S. PATENT DOCUMENTS

| 4,460,751 | 7/1984 | Hanlon et al. ........................ 525/371 |
|---|---|---|
| 4,524,829 | 6/1985 | Hanlon et al. ........................ 166/294 |
| 4,617,132 | 10/1986 | Dalrymple et al. ................. 166/310 X |
| 4,640,358 | 2/1987 | Sampath ................................ 166/274 |
| 4,647,312 | 3/1987 | Sampath . |
| 4,706,754 | 11/1987 | Smith ................................... 166/295 |
| 5,089,149 | 2/1992 | Ridland et al. ................... 166/308 X |

FOREIGN PATENT DOCUMENTS 2226024  6/1990  United Kingdom .

*Primary Examiner*—George A. Suchfield
*Attorney, Agent, or Firm*—Birch, Stewart, Kolasch & Birch, LLP

[57] ABSTRACT

The permeability of a subterranean reservoir can be more easily controlled by first injecting a crosslinking agent solution and then subsequently injecting a scleroglucan solution to thereby form, in situ, crosslinked scleroglucan gel. This reverse order of injection allows for a more homogeneous gel propagation without substantial risk of plugging.

15 Claims, No Drawings

SCLEROGLUCAN GEL APPLIED TO THE OIL INDUSTRY

This application is a divisional of application Ser. No. 08/160,332, filed on Dec. 2, 1993, which is a Rule 62 continuation application of Ser. No. 07/783,126, filed on Oct. 28, 1991, now abandoned the entire contents of which are hereby incorporated by reference.

The present invention relates to new crosslinking compositions for polysaccharides, in particular scleroglucan. It also relates to aqueous gel compositions including these crosslinking compositions and to a process for their injection and their uses, in particular in oil exploitation.

It is known to employ polymers of various types as a thickening or viscosity-improving agent making it possible to increase substantially the viscosity of water or of aqueous solutions. The polymers most generally employed are either synthetic polymers of the polyacrylamide, polyvinylpyrrolidone or polyvinyl sulphonate type and their derivatives, or natural polymers such as proteins of high molecular mass, such as gelatin, or polysaccharides extracted from seeds, such as guar gum, or from seaweed, such as alginates or carraghenans, or biopolymers produced by fermentation initiated by bacteria or fungi, such as scleroglucan, which is known for its high viscosity-improving capacity.

It is also known that, in order to increase the thickening power of these water-soluble polymers, it is possible to promote intermolecular crosslinking reactions, by a chemical or physical route, thus producing aqueous gels with three-dimensional structure.

Such gels are employed in the oil industry, especially for improving the yield of certain difficult exploitations, for example to prevent water irruptions in some production wells at the active water-bearing level by modifying the water permeability of the water-bearing reservoir, or for modifying permeability profiles. U.S. Pat. No. 4,647,312 describes in particular an aqueous gel comprising an aqueous phase and a suitable proportion of a product obtained by crosslinking scleroglucan with a zirconium tetrachloride in the presence of a crosslinking agent.

Owing to the use of scleroglucan, such a gel has a high viscosity-improving capacity. However, it has a major disadvantage insofar as it cannot be employed in particular in seawater because zirconium chloride precipitates in the presence of divalent ions, such as $Ca^{++}$ or $Mg^{++}$.

Aqueous gels synthesised hitherto have two great disadvantages: firstly a low stability in difficult exploitation environments, because of the salinity but above all because of high temperatures, and then in these cases kinetics of crosslinking which are too fast and/or uncontrollable, and this results in immediate blocking of the deposit in the vicinity of the injection wells, even in cases of in-situ mixing. In general, any phenomenon or operation capable of creating or introducing particles at the deposit level must be avoided to prevent blocking during injection.

It has now been found that the use of water-soluble complexes of polyvalent metal cations, in particular of zirconium and titanium, as crosslinking agents for scleroglucan makes it possible to obtain aqueous gels of high viscosity-improving capacity, which are stable even in seawater and at high temperature and whose crosslinking kinetics can be controlled.

The subject of the present invention is new crosslinking agent compositions capable of crosslinking polysaccharides and in particular scleroglucan, characterised in that they contain at least one complex based on a water-soluble polyvalent metal cation, in particular zirconium Zr(IV) or titanium Ti(IV), and on an organic acid complexing the cation, more particularly an alpha-hydroxylated one.

Another subject of the present invention is new aqueous gels containing scleroglucan and a complex capable of forming, in an aqueous medium, a gel with scleroglucan based, on the one hand, on a metal cation, in particular zirconium Zr(IV) or titanium Ti(IV) and, on the other hand, on an organic acid, more particularly alpha-hydroxylated ones, as a complexing agent.

Among the alpha-hydroxylated organic acids those chosen will be more particularly an alpha-hydroxycarboxylic acid such as lactic acid or malic acid.

A proportion, which on a mass basis is preferably smaller than that of the metal cation, of a weak base (for example aqueous ammonia or amine) is advantageously introduced into the aqueous composition of the complex to make it possible to solubilise the water-insoluble alpha-hydroxylated zirconium complex.

The strength of the complex is also directly related to the organic acid/metal cation molar ratio, the strength of the complex being greater the higher this ratio (everything else being otherwise equal). The strength of the complex determines its stability in seawater, this being proportionately higher the greater the strength of the complex.

Scleroglucan is a nonionic branched homopolysaccharide in which the main chain consists of series of units of $\beta$1-3D-glucose type, replaced every 3 units by a $\beta$1-6D-glucose unit.

Scleroglucan is obtained by fermentation of media containing carbohydrates, initiated by Sclerotium fungi and especially by a fungus of the Sclerotium rolfsii type (ATCC 15206).

The molar ratio of alpha-hydroxylated acid to metal cation is between 0.5 and 4.

The zirconium complexes capable of forming an aqueous gel with scleroglucan are zirconium complexes based on lactic acid, the lactic acid/zirconium molar ratio being preferably between 0.5 and 4 and more particularly between 2 and 4. If the organic acid employed is malic acid/zirconium the ratio is preferably between 0.5 and 1.5. Two commercial products sold by SPCI (Société des Produits Chimiques Industriels) under the names of Zircomplex PN or Zircomplex PA may be mentioned as an example.

The weight concentrations of polymer generally vary from 150 to 5,000 ppm and preferably between 200 and 2,000 ppm. The weight concentrations of zirconium complex vary between 100 and 10,000 ppm by weight of zirconium and preferably between 1,000 and 5,000 ppm.

An aqueous medium is intended to mean water with all the constituents which may be dissolved therein, that is to say salts, but also other additives which are necessary for an application.

A number of methods may be employed to prepare these gels.

A first method consists in simultaneously mixing all the constituents of the gel and reacting them under conditions which are suitable for crosslinking. In the case of the use of the least complexed complexes (for example Zircomplex PN), an organic polyacid such as citric acid will be advantageously added as an additive to the crosslinking agent composition, to stabilise the solution and to avoid, for example, the formation of a colloidal complex and precipitation in seawater. It is found, in fact, that the presence of citric acid improves the stability in seawater, in particular of the solution of complexing agent, in particular at low zirconium concentrations. However, the quantity of organic polyacid must not exceed a limiting quantity, otherwise the crosslinking may be prevented. In the case of a solution containing Zircomplex PN at a concentration of 2,000 ppms optimum stabilisation in a tube has been obtained at a concentration of $2 \times 10^{-3}$ mol of citric acid (corresponding to 352 ppm) and a citric acid/Zr ratio of 0.176. In a porous medium the optimum ratio of the citric acid/Zr concentrations is 0.5. In the case of a citric acid concentration of $10^{-2}$ mol/l (that is 1,760 ppm with Zr at 2,000 ppm), crosslinking does not take place. The citric acid/Zr ratio must preferably not exceed 0.8 even in the case of use in a porous medium.

The more the lactic acid/zirconium molar ratio increases, the more stable is the complex, especially in seawater. However, an excessively high stability must be avoided because it results in crosslinking being prevented.

In the case where too stable a complex is employed (for example Zircomplex PA), a basic compound such as sodium hydroxide will be advantageously added as a constituent of the gel to destabilise the complex. It is found, in fact, that no gel formation takes place in this case if the pH is not sufficiently high and in particular if the pH is not 9 or higher. The basic compound may be, for example, sodium hydroxide, aqueous ammonia or hot ethanolamine.

Another method for preparing the gel consists in producing, on the one hand, a solution of scleroglucan and, on the other hand, a solution of crosslinking agent. A solution of crosslinking agent means a solution optionally containing an organic polyacid or a basic compound besides the metal cation complex. The gelling is then carried out in situ, the introduction being performed by sequential injection of biopolymer solution and of crosslinking agent solution.

A network of crosslinked polymer is formed in the matrix of the formation and gradually reduces the latter's permeability.

A sequential injection process of this kind is described in U.S. Pat. No. 4,647,312. It is indicated therein that the order of injection of the various solutions is not critical. The injection of polymer solution as the first step is, however, recommended. It is, indeed, usual in the trade to begin by injecting the main product, that is to say the polymer solution in this case.

It has now been found that, contrary to the teaching of the prior art, the order of injection of the gel-forming aqueous compositions according to the invention is decisive for a homogeneous introduction and good propagation of the gel and that this order is the reverse of that commonly accepted as preferable by the profession.

The invention also relates to a process for introducing compositions in the form of, on the one hand, scleroglucan solution and, on the other hand, of a complex of a polyvalent metal cation and of an organic, in particular alpha-hydroxylated, acid, which process consists in performing alternate successive injections firstly of solution of a crosslinking agent and then of polymer solution. A solution of crosslinking agent according to the invention is first of all injected into the well at the level of the formation to be treated, and then a scleroglucan solution, in particular at a concentration of between 150 and 5,000 ppm. Thus, using successive crosslinkings, an adsorbed multilayer of polymer is produced by means of the crosslinking agent, continuing until the complete gel is formed. This method is particularly suitable for consolidated deposits of low permeability, in particular lower than 200 mD but capable of reaching 600 or 700 mD. It also has the advantage of controlling the permeability of the medium perfectly without any risk of untimely blocking of the formation, even in the case of a large number of successive injections, by adapting the number of layers in the multilayer.

The gels of the invention are particularly well adapted to oil applications, especially for improving the scavenging with water by treatment of injection wells or for preventing water irruptions by treatment of production wells, by virtue of their ease of injection but also of their stability under difficult use conditions (high salinity and high temperature).

In general, they are also employed for any application requiring stable aqueous gels exhibiting high elastic mechanical properties.

The invention having been described in its general context, the following examples will make it possible to illustrate it better without, however, limiting it.

The scleroglucan employed is refined scleroglucan marketed by Sanofi Bio-Industries under the name of "ACTIGUM CS11". The complexes employed are "ZIRCOMPLEX PN" and "ZIRCOMPLEX PA " marketed by SPCI.

An analysis of these concentrated aqueous solutions shows that "ZIRCOMPLEX PN" consists of 9.9 mass % of zirconium (density d=1.23), 25.6 mass % of lactic acid and 5.5 mass % of aqueous ammonia and ammonium ions, that is a lactic acid/zirconium molar ratio of 2.6, whereas "ZIRCOMPLEX PA", which is more complexed, consists of 7.3 mass % of zirconium (density 1.19), 24.6 mass % of lactic acid and 4.8 mass % of aqueous ammonia and ammonium ions, that is a lactic acid/zirconium molar ratio of 3.4.

EXAMPLE 1

Difference in Behaviour of $ZrCl_4$ and of the Zircomplexes

On the one hand, an equal volume of zirconium chloride $ZrCl_4$ was introduced into an equal volume of, firstly, distilled water, then water with 36 g/l of NaCl and, finally, ASTM seawater (reconstituted seawater with various cations according to standard D1141-50T, modified to have pH of 7.2). Two clear solutions were obtained in the first two cases respectively. In the ASTM seawater the zirconium chloride precipitated; with the seawater there is therefore instability.

"ZIRCOMPLEX PN" in a proportion of 2,000 ppm and citric acid in a proportion of $2 \times 10^{-3}$ mol/l were introduced into ASTM seawater. A solution which was stable for at least 40 hours at 60° C. was obtained. Introduction of scleroglucan into such a solution results in gel formation. It is found that if the proportion of citric acid is increased, everything else being otherwise equal, crosslinking with scleroglucan no longer takes place.

"ZIRCOMPLEX PA" was introduced into ASTM seawater. The solution obtained is stable whatever the Zircomplex PA concentration. The introduction of scleroglucan into such a solution, or of scleroglucan to which sodium hydroxide has been added to bring the pH to 9, results in gel formation. If the quantity of sodium hydroxide is decreased so that the pH of the solution becomes lower than 9 gel is no longer formed.

In a real porous medium the limiting quantities are always several times higher than those obtained in laboratory tests.

EXAMPLE 2

Stability of the Zircomplexes by Themselves in Solution in an ASTM Seawater at 40° C.

| Zircomplex PN concentration (ppm) | 2000 | 5000 | 10,000 | 15,000 | 20,000 |
|---|---|---|---|---|---|
| Stability | <10 h | 4 days | 1 month | >1 month | >1 month |

The stability of "ZIRCOMPLEX PN" in solution depends on the concentration.

Solutions containing "ZIRCOMPLEX PA" are stable in ASTM seawater even when highly diluted. An alkaline environment is necessary to obtain crosslinking of the scleroglucan by Zircomplex PA.

EXAMPLE 3

Stability of "ZIRCOMPLEX PN" at 2,000 PPM With Added Citric Acid In Solution in a Seawater at 40° C.

| Citric acid mean conc. mol/l | 0 | $2 \times 10^{-3}$ | $4 \times 10^{-3}$ | $6 \times 10^{-3}$ | $8 \times 10^{-3}$ |
|---|---|---|---|---|---|
| Stability | <10 h | cloudy after 48 h | clear 20 days | >20 days | >20 days |

The stability of the solutions increases with the citric acid concentration.

EXAMPLE 4

Gelling

The work was done with mixtures containing scleroglucan at 4,000 ppm, "ZIRCOMPLEX PN" at 2,000 ppm and citric acid at a variable concentration, in ASTM seawater at 40° C. The time after which gelling took place was measured.

| Citric acid conc. mol/l | 0 | $10^{-4}$ | $5 \times 10^{-4}$ | $10^{-3}$ | $2 \times 10^{-3}$ | $4 \times 10^{-3}$ | $6 \times 10^{-3}$ | $8 \times 10^{-3}$ |
|---|---|---|---|---|---|---|---|---|
| Gel strength | strong gel | strong gel | strong gel | strong gel | strong gel | medium gel | no gel | no gel |
| Time hours | 48 | 48 | 48 | 72 | 96 | 96 | 120 | 120 |

(Strong gel = the gel mass forms a block
Medium gel = slight flow remains)

Mixtures containing more than $6 \times 10^{-3}$ mol/l of citric acid gelled after 1 week.

The addition of citric acid slows down the gelling.

A compromise is needed between stability in seawater and crosslinkability.

In the case of gelling in a tube the maximum citric acid concentration is $2 \times 10^{-3}$ mol/l but in the case of gelling in a porous medium it can be higher.

The gels obtained are reversible on addition of excess citric acid.

In a tube: preparation of a gel from scleroglucan at 4,000 ppm and "ZIRCOMPLEX PN" at 2,000 ppm to which $2 \times 10^{-3}$ mol/l of citric acid have been added. A wait of 48 h is needed to obtain the gel. Citric acid is then added so that it is at a concentration higher than $10^{-2}$ mol/l. After stirring, the mixture becomes fluid again and no longer gels.

EXAMPLE 5

Strength of the Gels Obtained

Measurements of elastic modulus E in pascals per metre (Pa/m) were made in the case of solutions containing either "ZIRCOMPLEX PN" or PA in ASTM seawater containing scleroglucan at 4,000 ppm. The results are given in the following table:

| Concentrations Zirconium, ppm | 300 | 400 | 500 | 1,000 | 2,000 |
|---|---|---|---|---|---|
| Zircomplex PN E in Pa/m | 60,000 | 130,000 | 500,000 | 700,000 | 800,000 |
| Zircomplex PA E in Pa/m | 70,000 | 150,000 | 700,000 | 750,000 | 900,000 |

The measurements of E are performed with the aid of a Stevens LFRA texture analyser. Values of E ranging from 6,000 to 900,000 Pa/m are obtained according to the increasing zirconium concentration. The gels undergo little syneresis at 90° C. and are stable for at least three months.

It is noted that, starting with a certain concentration of zirconium, the values of E reach a plateau. In the case of gels made from "ZIRCOMPLEX PA" the crosslinking is very fast (a few hours), whereas in the case of "ZIRCOMPLEX PN" a wait of at least 72 hours is needed.

EXAMPLE 6

Effect of the pH on the Kinetics of Gelling in the Case of ZrPA

Scleroglucan gels were produced with Zircomplex PA. An aqueous solution with a scleroglucan concentration fixed at 5,000 ppm is mixed with an aqueous solution containing "ZIRCOMPLEX PA". The solution is homogenised by magnetic stirring at the same time as the pH is brought to the desired values by adding sodium hydroxide NaOH. The mixtures are left to stand for 12 hours. All the mixtures, prepared in an ASTM seawater, have a scleroglucan concentration of 4,200 ppm and a Zircomplex concentration of 2,000 ppm.

The mixtures are then introduced into test tubes which are closed with a cap and are assessed as follows as a function of time. Gelling is considered to be present (symbol +) if the contents of the tube do not flow when the tube has been tilted at 45° to the horizontal with the cap downwards. When this is not the case, a viscous solution is always obtained (symbol –). In the intermediate case (symbol + and –) the whole gel slides, stretched, along the tube.

The results obtained are given in the following table.

| pH | 6 | 8 | 9 | 10 | 11 | 12 |
|----|---|---|---|----|----|----|
|    | – | – | + | +  | +  | +  |

Below pH = 9 there is no crosslinking.

EXAMPLE 7

Mechanical Reversibility of the Scleroglucan/"ZIRCOMPLEX PN" (ZrPN) or "ZIRCOMPLEX PA" (ZrPA) gels One of the advantages of the gels of water-soluble polymers which are crosslinked physically by polyvalent metal cations is their "mechanical reversibility", that is to say that their viscosity can be reduced by mechanical shearing, but once this stress is removed the gel recovers most of its initial characteristics.

The following example shows that the scleroglucan/"ZIRCOMPLEX PN" gels are perfectly reversible mechanically: that is scleroglucan/ZrPN or scleroglucan/ZrPA gels with 4,000 ppm of polymer and various Zr concentrations, produced with ASTM seawater. Evaluation of the elastic moduli E (in Pa/m) is made after a sufficiently long time for the gel to have formed (3 days in the case of ZrPN). The gels are then subjected to violent mechanical stirring (1 minute at 1,000 rev/min with a turbine of the ultra-Turrax type); the gel becomes a fluid solution again. After 3 days at rest the elastic moduli are reevaluated with the aid of a Stevens LFRA texture analyser.

The following table shows the values of E before and after mechanical shearing.

| Zr concentration ppm | 300 | 400 | 500 | 1,000 | 2,000 |
|---|---|---|---|---|---|
| Before shearing ZrPA | 70,000 | 150,000 | 700,000 | 750,000 | 900,000 |
| After shearing | 70,000 | 150,000 | 750,000 | 800,000 | 1,000,000 |
| Before shearing ZrPN | 60,000 | 130,000 | 500,000 | 700,000 | 800,000 |
| After shearing | 50,000 | 100,000 | 450,000 | 600,000 | 800,000 |

It is noted that the gel recovers its characteristics after mechanical shearing and a period of rest.

EXAMPLE 8

Evaluation of the decrease in water permeability of a permeable porous medium after the introduction of a scleroglucan/"ZIRCOMPLEX PN" gel by a sequential injection process.

In a consolidated porous medium of low permeability (permeability lower than 200 mD), of the Berea sandstone type, where there are problems of gel propagation by a simultaneous injection process once the polymer is brought into contact with its crosslinking agent, a "direct" sequential injection process is proposed (injection of a polymer solution, then of a crosslinking agent solution and then of water, in this order) or a "reverse" one (injection of a of crosslinking agent solution, then of a polymer solution, then of water, in this order) of the various constituents. The introduction and the in-situ crosslinking of the gel are thus carried out at the same time in the form of "multilayers" of adsorbed polymer, in the following manner, for example, in the case of the "reverse" injection process.

Formation of a first layer of adsorbed polymer (1st gap): injection of 1.5 equivalent pore volume of an ASTM seawater solution containing "ZIRCOMPLEX PN" (2,000 ppm as Zr metal) and $2\times10^{-3}$ mol/l of citric acid, followed by 2 equivalent pore volumes of an ASTM seawater solution containing 400 ppm of scleroglucan. The medium is purged with an ASTM seawater until the pressure around the cell has stabilised. After stabilisation (24 h) the water permeability is determined after treatment.

Formation of the n-th layer of adsorbed polymer (n-th gap): identical procedure, that is to say injection of ZrPN followed by scleroglucan and finally water.

In the case of the "direct" injection method the above operations are reversed.

The results obtained for the reduction in mobility and the reduction in water permeability are given in the following table for both the "direct" and "reverse" methods of injection and two gaps.

The equivalent pore volume is the name given to the equivalent of the volume of the communicating pores of the sandstone cell on which the tests are performed. The reverse injection tests were carried out on a first cell (cell 1 of the rock test sample—or "plug"—26) with an initial permeability of 150 mD and on a second cell (cell 2 of "plug" 26) with an initial permeability of 170 mD ($R_{K_w}$ and Kw measured for an injection flow rate corresponding to a forward movement of the front of the liquid phase inside the sample of 5 m/d).

The injection flow rates of the solutions are all equivalent to a forward movement of 1.25 m/day.

The direct injection tests were carried out on a first cell (cell 1 of "plug" 29) with a permeability of 120 mD and on a second cell (cell 2 of "plug" 29) with a permeability of 110 mD.

Crosslinking agent = ZrPN + citric acid

|  | TREATMENT: PLUG 26 Injection of: 1-crosslinking agents 2-polymer 3-seawater | | TREATMENT: PLUG 29 Injection of: 1-polymer 2-crosslinking agent 3-seawater | |
|---|---|---|---|---|
|  | first cell | second cell | first cell | second cell |
| Cell length | 3 cm | 3 cm | 4 cm | 4 cm |
| Initial Kw | 150 mD | 170 mD | 120 mD | 110 mD |
| $R_{K_w}$ - 1st gap | 6 | 1.8 | 1.65 | 1.85 |
| $R_{K_w}$ - 2nd gap | 21 | 13 | 6.5 to 63 | 6 |

Kw = water permeability of the porous medium (in Darcy units)
$R_{K_w}$ = reduction in water permebility
$R_{K_w}$ = Kw before treatment/Kw after treatment The first gap is more efficient in the case of "plug" 26. An onset of blocking is observed in the case of "plug" 29, first cell ($R_{K_w}$:6.5 to 63).

The propagation is better in the case where the crosslinking agent is injected first.

EXAMPLE 9

Evaluation of the reduction in water permeability of a permeable porous medium after introduction of a scleroglucan/"ZIRCOMPLEX PA" gel by a sequential injection process.

The operations of Example 8 are reproduced with a crosslinking agent based on "ZIRCOMPLEX PA". Only the reverse injection process is tested here, on the same "plug" (permeability 75 mD, diameter 2.27 cm, length 3.95 cm, volume 16 cm$^3$, pore volume 4 cm$^3$) which has been cut in two so as to constitute 2 cells (cell 1 and cell 2 of "plug" 18) at the end of handling to study the homogeneity of the treatment.

The operating method is as follows: 3 equivalent pore volumes of a solution of "ZIRCOMPLEX PA" (380 ppm as Zr metal) in an ASTM seawater are injected, followed by 5 equivalent pore volumes of a solution of scleroglucan (at 400 ppm) in an ASTM seawater (pH=7.2) followed by 5 equivalent pore volumes of a solution of ASTM seawater to which 0.2 g/l of NaHCO$_3$ and of NaOH have been added to adjust the pH to 9. The medium is purged with an ASTM seawater for 2 hours. The results are given in the following table. The pH is monitored at the outlet. All the injection flow rates correspond to a forward movement of 5 m/d, unless stated otherwise.

ZrPA crosslinking agent in basic medium

| | TREATMENT:PLUG 18 1-Injection of crosslinking agent 2-Injection of polymer 3-Injection of sodium hydroxide pH = 9 4-Injection of water | |
|---|---|---|
| | First cell | Second cell |
| Cell length | 2 cm | 2 cm |
| Initial Kw | 74 mD | 75 mD |
| R$_{Kw}$ 2nd gap measured at 2.5 m/d | 4 | 3.75 |

Good uniformity of the treatment is observed in both cells.

EXAMPLE 10

Thermal Stability of the Scleroglucan/Zircomplex Gels

The thermal stability of the scleroglucan/Zircomplex gels at various concentrations is studied by using a rheometer of Rhéomat 30 (Contraves) type fitted with a sealed cell with a magnetically driven rotor (DC44), permitting measurements at high temperatures (limit of the apparatus=7,500×10$^{-3}$ Pa s). The results are collated in the following table.

| Temperature (°C.) | | 25 | 75 | 125 | 150 | 165 | 170 |
|---|---|---|---|---|---|---|---|
| Viscosity (Pa s) at 1 s$^{-1}$ | (1) | 0.550 | 0.550 | 0.520 | 0.500 | 0.500 to 250 in 5 min | 0.200 |
| | (2) | 2.800 | 2.800 | 2.750 | 2.650 | 2.500 to 0.700 in 45 min | 0.600 |
| Apparatus limit | (3) | >>7.500 ← | | | | | → |
| | (4) | >>7.500 ← | | | → | 6.000 to 2.250 in 15 min | 1.400 | 1.200 |
| | (5) | >>7.500 ← | | | | → | 7.500 to 1.200 in 3 h |

(1) Scleroglucan/ZrPN 1,000/500 ppm + 2 × 10$^{-3}$ M citric acid
(2) Scleroglucan/ZrPN 2,000/1,000 ppm + 2 × 10$^{-3}$ M citric acid
(3) Scleroglucan/ZrPN 4,000/2,000 ppm + 2 × 10$^{-3}$ M citric acid
(4) Scleroglucan/ZrPN 4,000/2,000 ppm without citric acid
(5) Scleroglucan/ZrPA 1,000/500 ppm pH = 9.

The upper limiting temperature of use of these gels can reach 170° C.

EXAMPLE 11

Propagation of the Solutions of ZrPN and and ZrPA Complexes in a Porous Medium

A solution containing zirconium at a given concentration in distilled water is injected and the zirconium at the outlet is determined by fluorescence.

The operation is carried out with ZrCl$_4$, "ZIRCOMPLEX PN" at 400 ppm, "ZIRCOMPLEX PN" at 5,000 ppm and "ZIRCOMPLEX PA" at 4,000 ppm.

The volume of the pores, which corresponds to the accessible volume in the sample of porous medium, is called Vp.

1- ZrCl$_4$:

When ZrCl$_4$ is injected at 400 ppm, no Zr is detected at the outlet of the sample of porous medium.

Zirconium is adsorbed too much on the walls and there is no propagation.

2- ZrPN 400 ppm

| Volume injected in Vp | 0.83 | 1.08 | 1.33 | 1.58 | 1.83 | 2.08 | 2.33 | 2.58 | 2.83 | 3.08 |
|---|---|---|---|---|---|---|---|---|---|---|
| Zr conc. at outlet ppm | <0.1 | <0.1 | 0.5 | 21 | 93 | 187 | 333 | 391 | 400 | 400 |
| % of Zr | 0 | 0 | 0.1 | 5 | 23 | 47 | 83 | 98 | 100 | 100 |

Adsorption is no longer observed after 3 Vp, the solution of Zircomplex PN propagates well.

3- ZrPN 5,000 ppm

| Volume injected in Vp | 0.71 | 1.24 | 1.42 | 1.60 | 1.96 | 2.31 | 3.02 | 4.0 |
|---|---|---|---|---|---|---|---|---|
| Zr con. at outlet ppm | <0.1 | 94 | 920 | 1580 | 3390 | 3470 | 4450 | 5000 |
| % of Zr at outlet | 0 | 1.9 | 18 | 32 | 68 | 69 | 89 | 100 |

Adsorption is no longer observed after 4 Vp, the solution propagates well even though more concentrated.

4- ZrPA 400 ppm

| Volume injected in Vp | 0.68 | 1.36 | 2.04 | 2.73 | 3.40 | 4.08 | 4.76 | 5.44 | 6.12 |
|---|---|---|---|---|---|---|---|---|---|
| Zr conc. at outlet | <0.1 | 56 | 284 | 376 | 368 | 380 | 384 | 388 | 400 |
| % of Zr at outlet | 0 | 14 | 71 | 94 | 92 | 95 | 96 | 97 | 100 |

Adsorption is no longer observed after 3 Vp. There is good propagation of the Zircomplex PA solution.

We claim:

1. A process for selectively reducing the permeability of a subterranean reservoir, which comprises:

(i) firstly, injecting a crosslinking agent solution, comprising at least one water-soluble complex of a polyvalent metal, into a well at a depth corresponding to a formation to be treated; and thereafter (ii) secondly, injecting a solution of scleroglucan, having a scleroglucan content of between 150 and 5,000 ppm, to thereby form a layer of crosslinked scleroglucan gel.

2. The process according to claim 1, which further comprises repeating, sequentially, said steps (i) and (ii) and thereby forming a subsequent layer of crosslinked scleroglucan gel.

3. The process according to claim 1, wherein said polyvalent metal is zirconium or titanium.

4. The process according to claim 3, wherein said polyvalent metal is zirconium.

5. The process according to claim 1, wherein said water-soluble complex comprises a zirconium (IV) or titanium (IV) cation and an organic acid complexing said cation.

6. The process according to claim 5, wherein said organic acid is an alpha-hydroxylated organic acid.

7. The process according to claim 6, wherein said organic acid is lactic acid or malic acid.

8. The process according to claim 6, wherein the alpha-hydroxylated acid and metal cation are contained in a molar ratio of one to the other, respectively, of 0.5 to 4.

9. The process according to claim 5, wherein said metal cation is zirconium (IV).

10. The process according to claim 1, wherein said crosslinking agent solution further comprises injecting a weak base selected from ammonia and amines.

11. The process according to claim 1, wherein said crosslinking agent solution further comprises an organic polyacid.

12. The process according to claim 11, wherein said organic polyacid is citric acid.

13. The process according to claim 1, wherein said crosslinking agent solution further comprises a basic compound selected from sodium hydroxide, aqueous ammonia, and hot ethanolamine.

14. The process according to claim 1, wherein said solution of scleroglucan has a scleroglucan content of 2 to 2,000 ppm.

15. The process according to claim 1, wherein said water-soluble complex is a zirconium complex and is contained in said crosslinking agent solution in a concentration of from 1,000 to 5,000 ppm.

* * * * *